June 15, 1954  L. HUNTER, JR  2,680,974
WHEEL BALANCING DEVICE
Filed April 30, 1947
4 Sheets-Sheet 1
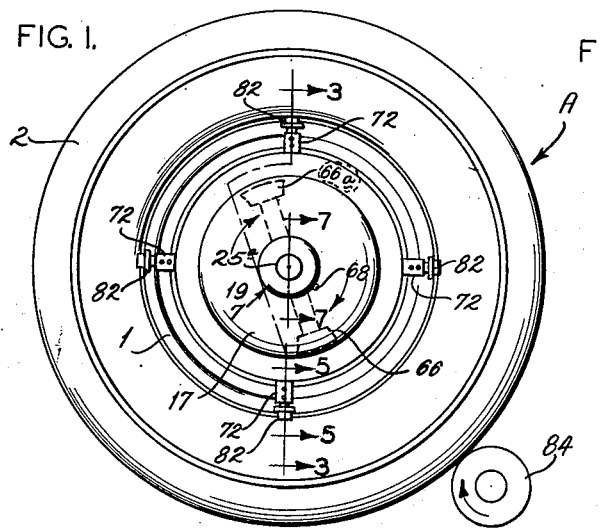
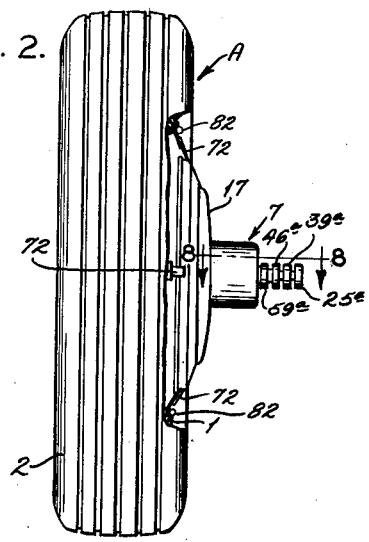
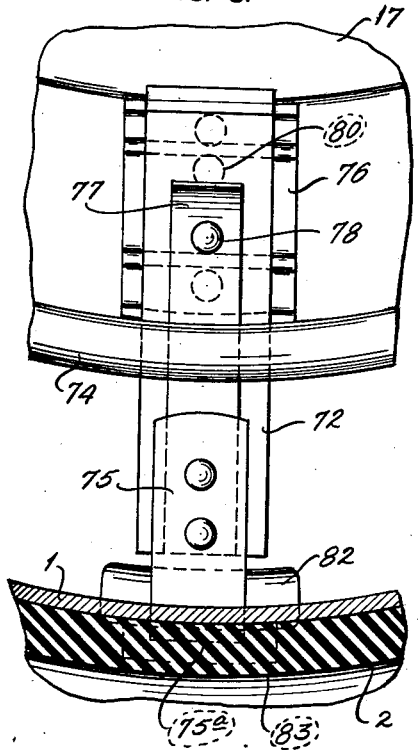
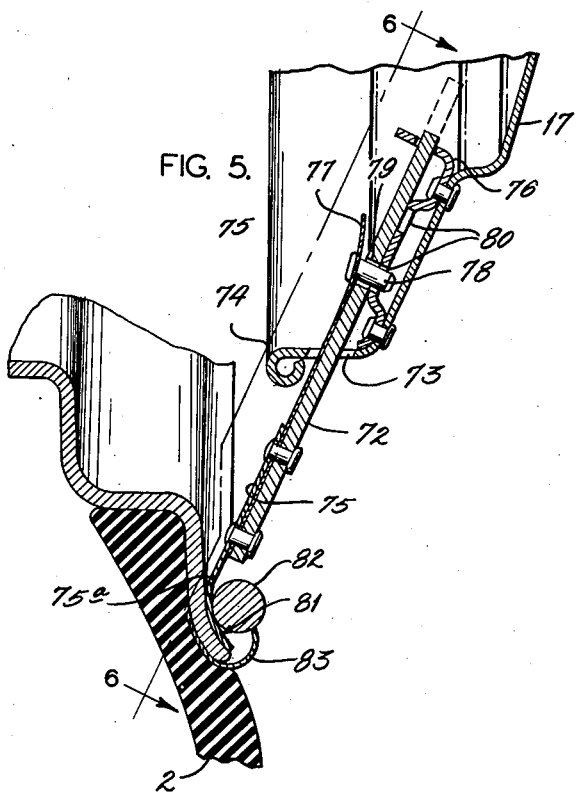
INVENTOR:
Lee Hunter, Jr.,
by Carr Kerr & Gravely
HIS ATTORNEYS.

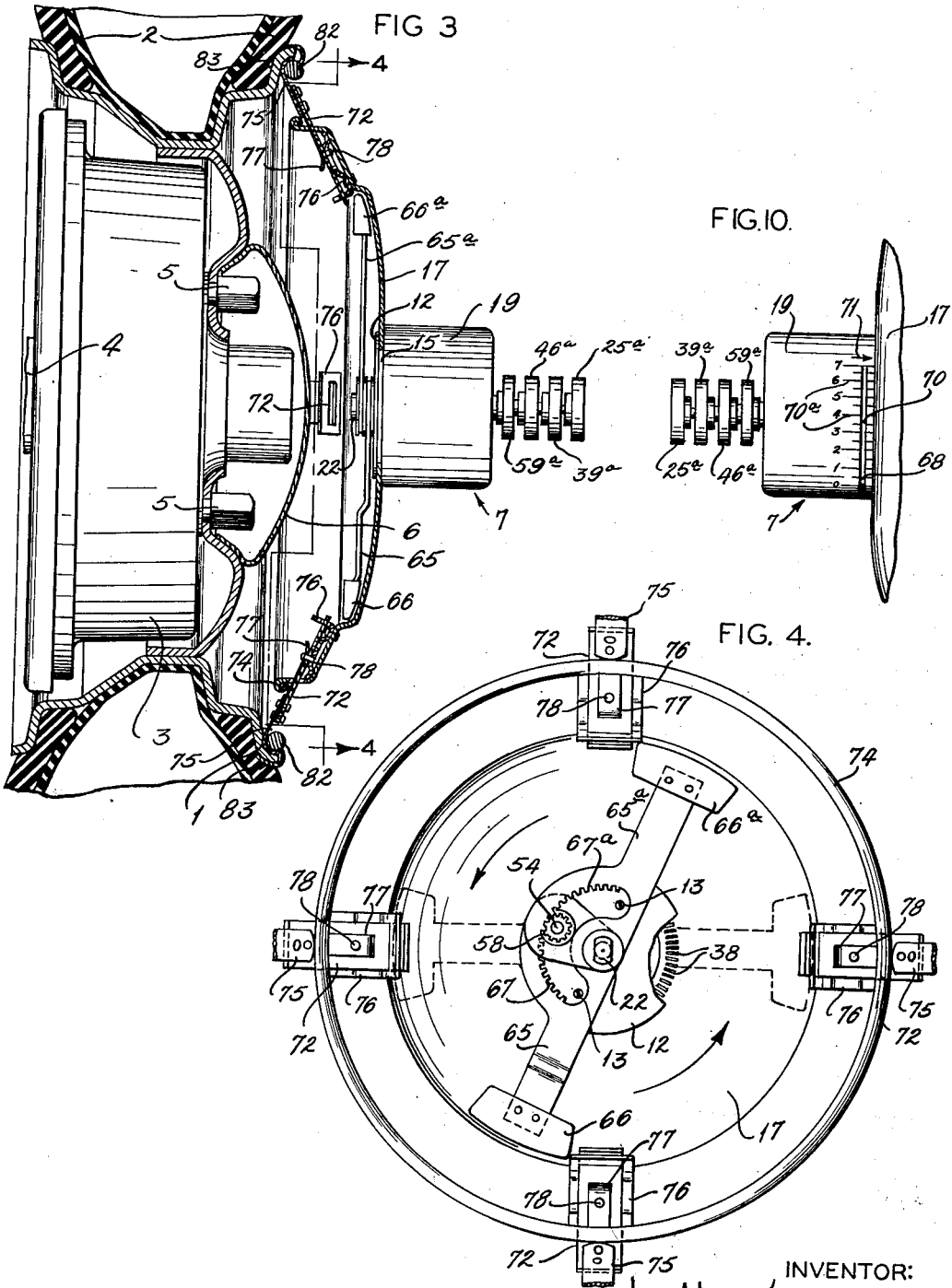

June 15, 1954

L. HUNTER, JR 2,680,974

WHEEL BALANCING DEVICE

Filed April 30, 1947

4 Sheets-Sheet 3

INVENTOR:
Lee Hunter, Jr.,
by Carr Kan & Gravely,
HIS ATTORNEYS.

INVENTOR:
Lee Hunter, Jr.,
by Carr Van Gravely,
HIS ATTORNEYS.

Patented June 15, 1954

2,680,974

UNITED STATES PATENT OFFICE 2,680,974

WHEEL BALANCING DEVICE

Lee Hunter, Jr., University City, Mo.

Application April 30, 1947, Serial No. 744,887

10 Claims. (Cl. 73—66)

This invention relates to devices for balancing rotary bodies, such as automobile wheels. The invention has for its principal object to provide a device which can be easily carried by hand and readily mounted as a complete self-contained unit on the wheel for rotation therewith to quickly and accurately determine the amount of unbalance thereof and the location and the amount of weight required to counterbalance such unbalance without dismounting the wheel from the automobile. Other objects are simplicity and cheapness of construction, compactness of design and lightness of weight. The invention consists in the wheel balancing device and in the parts and combinations and arrangements of parts herein- after described and claimed.

Figure 8:
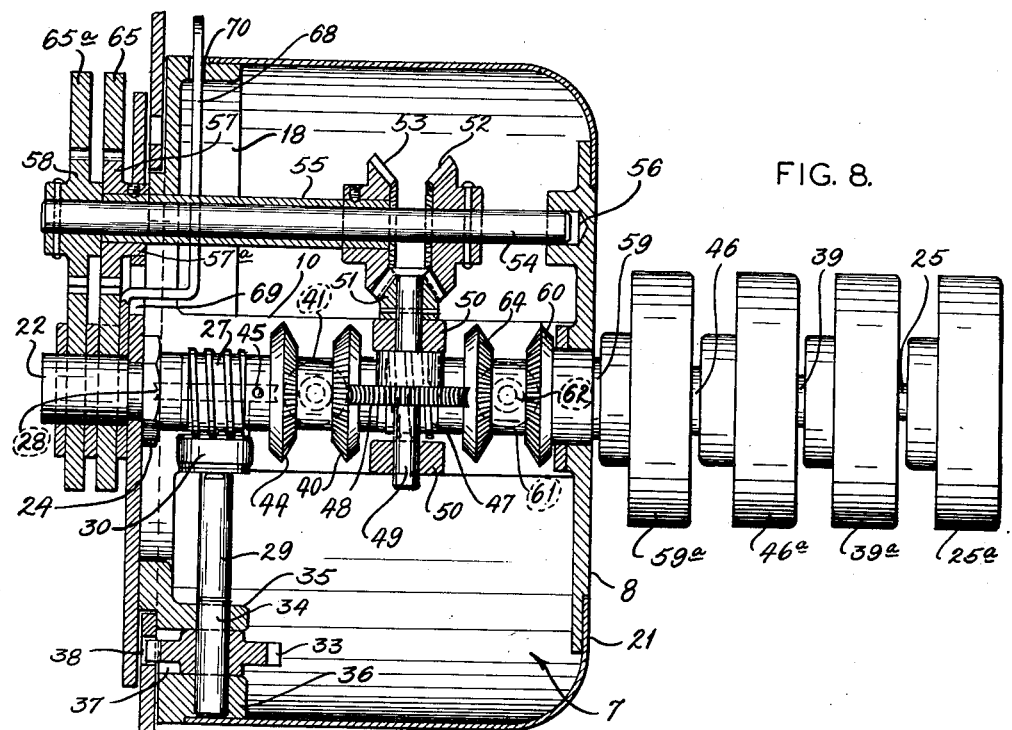
Figure 7:
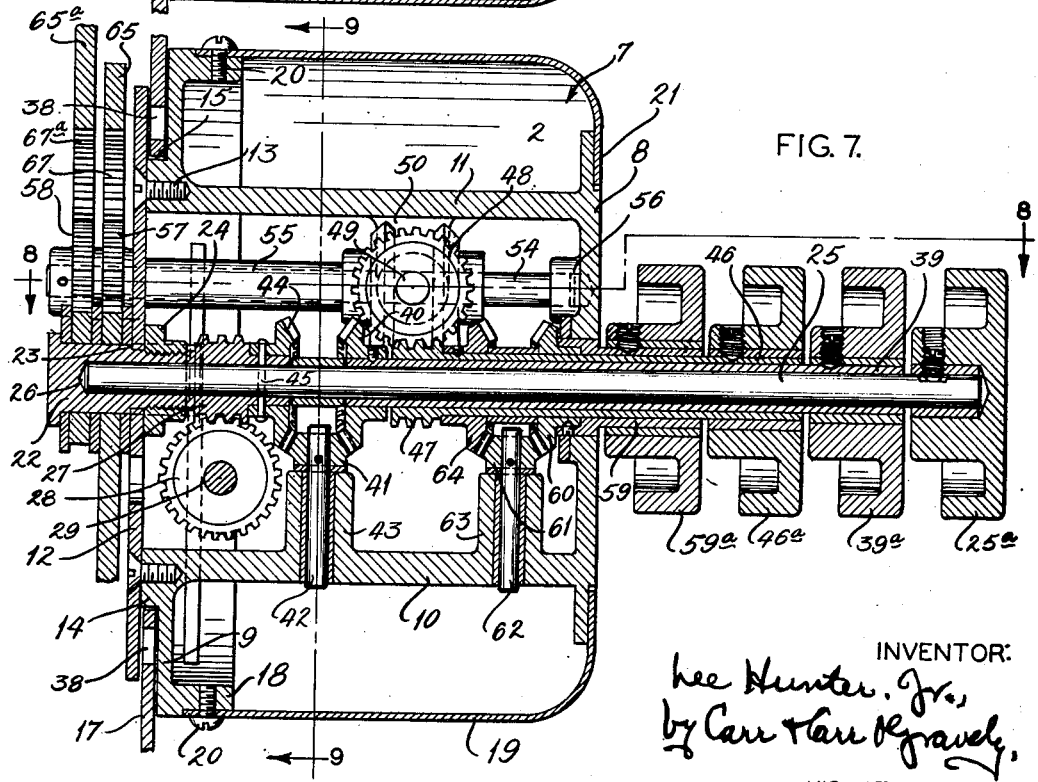
Figure 9:
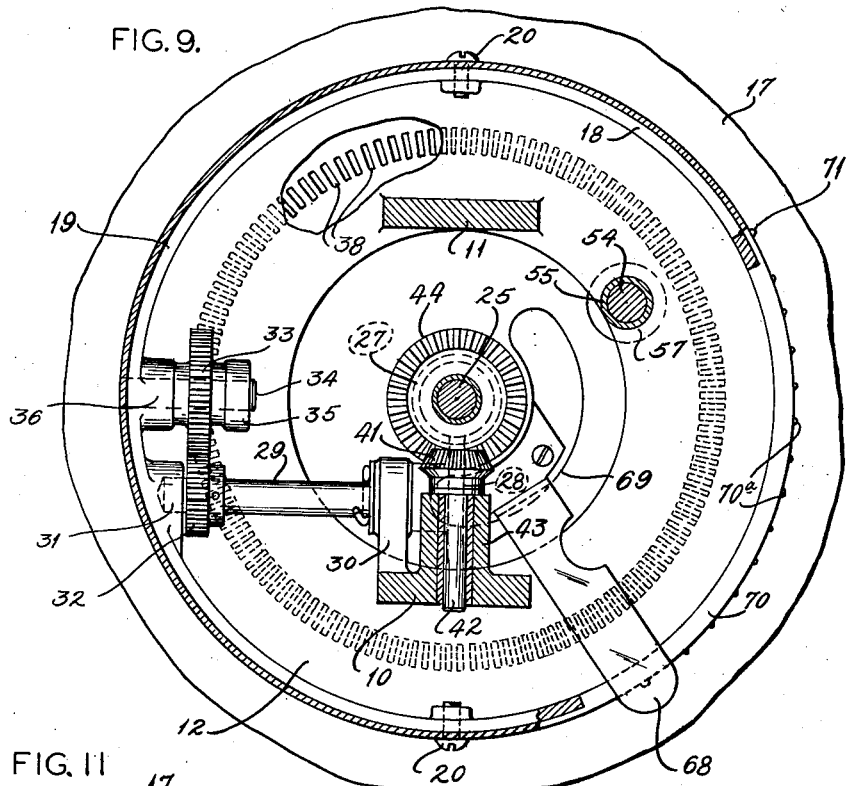
Figure 11:
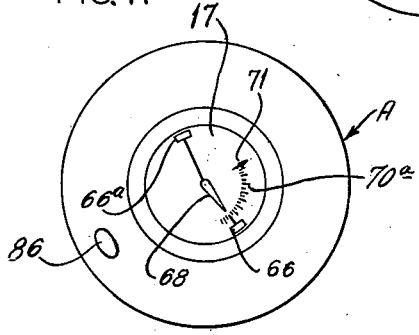
Figure 13:
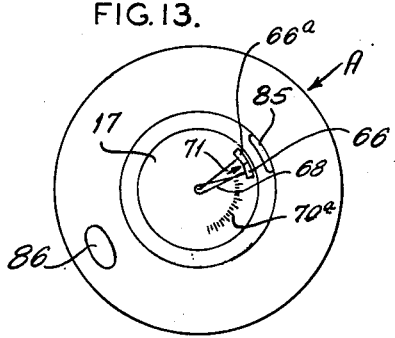
Figure 12:
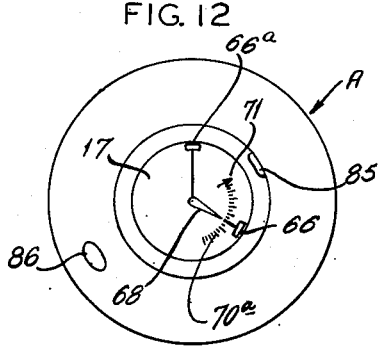

In the accompanying drawings, which form part of this specification, and wherein like symbols refer to like parts wherever they occur, Fig. 1 is an outer side elevational view of an automobile wheel, showing my wheel balancing device applied thereto, Fig. 2 is an edge elevational view of said wheel with the balancing device mounted thereon, Fig. 3 is an enlarged fragmentary diametral sectional view on the line 3—3 in Fig. 1, Fig. 4 is a cross-sectional view on the line 4—4 in Fig. 3, Fig. 5 is an enlarged fragmentary sectional view on the line 5—5 in Fig. 1, Fig. 6 is a sectional view on the line 6—6 in Fig. 5, Fig. 7 is an enlarged central longitudinal sectional view through the balancing device on the line 7—7 in Fig. 1, Fig. 8 is a longitudinal sectional view on the line 8—8 in Fig. 7, Fig. 9 is a cross-sectional view on the line 9—9 in Fig. 7, Fig. 10 is a fragmentary side elevational view of the device looking at the side opposite from that shown in Fig. 3; and Figs. 11, 12 and 13 are diagrammatic side elevational views of the wheel, showing the balancing weights in different positions of rotary adjustment relative to one another and to the heavy spot in the wheel.

As shown in the accompanying drawings, the rotary body that is to be balanced comprises a conventional automobile wheel A including a rim 1, a pneumatic tire 2 mounted thereon, a brake drum 3 rotatable with the axle or shaft 4 for said wheel, bolts 5 for securing said rim to said brake drum and a snap-on hub cap 6 for covering said bolts.

My device for determining the unbalance of the automobile wheel A and the location and amount of weight required to correct such unbalance comprises a cage 7 having a circular outer end wall 8, an annular inner end wall 9 concentric with said outer end wall, two diametrically opposite longitudinal bridges 10 and 11, integrally connecting said outer and inner end walls in axially spaced relation, and a circular plate 12 secured by screws 13 flatwise to an outstanding annular rib 14 formed on the outer end face of said annular inner end wall around the inner periphery thereof for closing the central opening therethrough. The end closure plate 12 extends radially outwardly of the annular rib 14 and forms therewith and with the annular inner end wall 9 of the cage 7 a peripheral annular groove 15 therein in which is rotatably supported a cup-shaped mounting disk 17 that is of considerably larger diameter than said inner end wall and opens away therefrom. The annular inner end wall 9 of the cage 7 has a rim flange 18 that extends in the direction of the outer end wall 8 of said cage; and said cage is provided with a cylindrical casing or cover 19, whose inner end seats on and is secured by screws 20 to said rim flange and whose outer end has an inturned annular flange 21 that seats against the outer face of the outer end wall 8 of said cage. The cage 7 and casing 19 form a closed cylindrical housing and the rotary connection between the inner end of said housing and the dished mounting disk 17 permits relative rotary movement of said housing and disk.

Extending through an axial hole provided therefor in the end closure plate 12 of the cage 7 is a stud 22 having an annular shoulder 23 that abuts against the outer face of said plate and a threaded inner end portion on which is threaded a nut 24 for rigidly clamping said stud to said plate. Extending through the cage 7 axially thereof is a shaft 25, one end of which is journaled in an axial bore 26 provided therefor in the stud 22 and the other end of which has an operating knob 25a secured thereto some distance outwardly from the outer end wall 8 of said cage. Located within the cage 7 is a worm 27 which is mounted on the shaft 25 for rotation therewith adjacent to the supporting stud 22 therefor. The worm 27 intermeshes with a worm gear 28 fixed to a cross shaft 29 journaled near one end in a bearing 30 provided therefor on the longitudinal bridge 10 of said cage. At its opposite end, the cross shaft 29 is journaled in a pocket bearing 31 provided therefor in the annular inner end wall 9 of the cage 7 and is provided with a spur gear 32 that intermeshes with a spur gear 33 mounted on a shaft 34 supported radially of the cage 7 in a bearing 35 formed on the inner face of the annular inner end wall 9 of said cage and a bearing 36 formed on the inner face of the rim flange 18 of said wall. The spur gear 33 rotates through an opening 37 which extends through the annular inner end wall 9 of the cage and opens into the annular peripheral groove 15 in the cage 7; and said gear intermeshes with a circular series of gear rack holes 38 formed in the portion of the cup-shaped mounting disk 17 supported in said groove. By this arrangement, relative rotary movement is imparted to the cage 7 and the mounting disk 17 therefor by manipulating the knob 25a fixed to the exposed outer end of the shaft 15.

Journaled on the shaft 25 is a tubular shaft 39 whose inner end terminates inside the cage 7 where it is provided with a beveled gear 40 which intermeshes with a beveled pinion 41 fixed to a stud shaft 42 journaled in a bearing 43 formed on the bridge 10 of the cage 7 radially thereof. The beveled pinion 41 acts as an idler and intermeshes with a beveled gear 44 that is mounted on the hub of the worm 27 on the operating shaft 25. The beveled gear 44 and the worm 27 are rigidly secured together and to the shaft 25 by means of a pin 45. The tubular shaft 39 extends outwardly beyond the outer end of the cage 7 where it is provided just inwardly of the operating knob 25a with an operating knob 39a. By this arrangement, relative rotary movement may be imparted to the cage 7 and its mounting disk 17 by means of the knob 39a as well as by means of the knob 25a. This relative movement occurs through the action of slowing down the knobs 39a or 25a, as the case may be, thus causing the gears 40 or 27, respectively, to drive the associated train of gears.

Journaled on the tubular shaft 39 is a tubular shaft 46 that terminates inside of the cage 7 in a worm 47 which intermeshes with a worm gear 48 fixed to a cross shaft 49 that is journaled in bearings 50 provided therefor in the bridge member 11 of the cage. The tubular operating shaft 46 extends beyond the outer end wall 8 of the cage 7 and has an operating knob 46a fixed thereto just inwardly of the operating knob 39a for the operating shaft 39. When knob 46a is held or its rotation reduced, the gear 47 acts to drive the train of gears connected thereto.

Fixed to the cross shaft 49 is a beveled pinion 51 which intermeshes continuously with two beveled gears 52 and 53, respectively. The beveled gear 52 is fixed to a shaft 54 and the beveled gear 53 is fixed to a tubular shaft 55 journaled on the shaft 54, both shafts being disposed alongside of the tubular shaft 46 in spaced parallel relation thereto. The shaft 54 is supported at one end in a pocket bearing 56 provided therefor in the outer end wall 8 of the cage 7. At the other or inner end of the cage 7, the shafts 54 and 55 extend through a hole provided therefor in the end closure plate 12. The tubular shaft 55 projects beyond the end closure plate 12 and has a spur gear 57 fixed thereto having a hub portion 57a supported in the shaft receiving opening in said closure plate. The shaft 54 also has a spur gear 58 secured thereto outwardly of and of the same size as the spur gear 57 secured to the tubular shaft 55.

Rotatable on the tubular operating shaft 46 and in the central opening in the outer end wall 8 of the cage 7 is a tubular operating shaft 59 which is provided just inside said cage with a beveled gear 60. The shaft 59 extends outside of the cage 7 and an operating knob 59a is secured to the outer end of said shaft between the outer end wall of said cage and the operating knob 46a for the tubular operating shaft 46. The beveled gear 60 intermeshes with a beveled pinion 61 fixed to a stud shaft 62 disposed radially of the cage 7 in a bearing 63 formed on the longitudinal bridge 10 thereof. The beveled pinion 61 acts as an idler and intermeshes with a beveled gear 64 fixed to the tubular operating shaft 46 adjacent to the worm 47 thereon. In this case, the gear 60 acts to drive the train of gears when knob 59a is held or its rotation decreased.

Journaled on the central stud 22 between the headed outer end thereof and the outer face of the closure plate 12 for the inner end of the cage 7 are two separate arms 65 and 65a that are disposed radially of said cage inside of the cup-shaped mounting disk 17 at said end of said cage and terminate at their respective outer ends in weights 66 and 66a of the same size and shape. The weight arm 65 is provided with an arcuate gear rack 67 that is disposed concentric to the supporting stud or pivot 22 therefor and intermeshes with the spur gear 57 on the tubular counter shaft 55; and the weight arm 65a is provided with a similar arcuate rack 67a that intermeshes with the spur gear 58 in the solid counter shaft 54. Secured to the weight arm 65 which intermeshes with the spur gear 57 on the tubular counter shaft 55 is a pointer 68 which is offset laterally to extend through an arcuate slot 69 in the closure plate 12 and thence radially outwardly through a circumferential slot 70 in the rim flange 18 of the annular inner end wall 9 of the cage 7 and the portion of the cylindrical casing 19 supported on said rim flange. The arcuate slots 69 and 70 are of sufficient length to accommodate an 80 degree relative rotary movement of the pointer 68 and the cage 7; and the shell or casing 19 has a scale 70a marked thereon along one edge of the slot 70 and graduated in ounces and fractions thereof. The cage casing 19 also has a longitudinal counterweight locating mark 71 on the outer peripheral surface thereof, said mark being located on a line disposed radially of the cage 7 and passing through axes of the shaft 25 and counter shafts 54, 55 for swinging the weight arms 65, 65a about the axes of said cage.

The cup-shaped mounting disk 17 is provided with four circumferentially spaced mounting fingers 72 that extend radially thereof through holes 73 provided therefor in the outer peripheral wall of said disk just inwardly of a curled rim portion 74 thereof. Each of the fingers 72 is in the form of a flat plate having a plate spring 75 rigidly secured thereto which terminates beyond the outer end of said finger in a free end portion 75a which is curved in the direction of the cage 7. Each of the fingers 72 is slidable radially of the mounting disk 17 in a supporting plate 76 secured therein; and a second plate spring 77 is secured to said finger longitudinally thereof and has a curled free inner end portion with a stud 78 rigidly secured thereto. The stud 78 fixed to the plate spring 77 extends through an opening 79 provided therefor in the mounting finger 72 and is adapted to enter either one of two holes 80 provided therefor in the supporting plate 76 for said finger, whereby said finger may be locked in either one of two positions of radial adjustment relative to said mounting plate.

When it is desired to balance the automobile wheel A, the hereinbefore described balancing device is mounted thereon concentric therewith by placing the cup-shaped mounting disk 17 opposite the outer face of the wheel and seating the curved spring ends 75a of the mounting fingers 75 of said disk in the concave annular depression 81 formed in the outsideface of said wheel by the outwardly curved peripheral outside marginal rim flange of the rim thereof, said fingers having been previously adjusted for the rim diameter of the wheel. The curved spring ends of the mounting fingers 72 are then secured to the rim flange of the wheel preferably by means of conventional automobile wheel counterbalancing weights 82, of equal value each having a cylindrical body that seats in said curved spring ends of said fingers and a radial anchor flange 83 that is bent around said rim flange between the latter and the tire 2. By this arrangement, the entire balancing device, including the cage 7, mounting disk 17 and balancing weights 66, 66a, is secured to the wheel concentric therewith for rotation about the axis thereof. One of the knobs, 46a or 59a is then turned to move the balancing weights 66, 66a relative to one another into a slightly unbalanced position; that is into a position with the two weights in the position shown in Fig. 11, say with the pointer 68 at the 1½ oz. position on the scale 70a, the weights moving away from each other when one knob is turned and towards each other when the other knob is turned. The wheel with the balancing device thus mounted thereon is then jacked up and rotated on its axis, each of the front wheels being rotated by means of a suitable power driven spinner 84 engaged with the tread of the tire 2 thereof, and the rear wheels being driven from the engine of the automobile.

With the balancing device adjusted and mounted on the wheel in the manner above described, the magnitude and location of the weight required to correct the running or dynamic unbalance of the wheel can be found by spinning the wheel at a speed at which such unbalance will produce considerable vibration which can be observed visually or by sense of touch, then holding the knob 25a or 39a until such vibration is reduced to a minimum, and then holding the knob 46a or 59a until no vibration is produced by the rotating wheel. The wheel is then stopped and the longitudinal mark 71 on the casing 19 indicates that the counterweight for correcting the unbalance of the wheel should be attached to the rim thereof at a point located radially opposite said mark, while the radial pointer 68 indicates on the scale 70a the magnitude of such correction weight. A correction weight 85 of the magnitude indicated on the scale 70a is then applied to the outside flange of the wheel rim 1 at the point indicated by the mark 71 to thereby correct the unbalance of the wheel. The balancing device is then removed from the wheel by disengaging the fastening weights 82 from the rim 1 thereof. The correction weight 85 preferably comprises a conventional wheel counterbalancing weight similar to the fastening weights 82.

Stopping or slowing down the rotation of the knob 25a with the rotating wheel produces relative rotary movement of said wheel and the two balancing weights 66 and 66a in one direction; and stopping or slowing down the rotation of the knob 39a produces relative rotary movement of said wheel and balancing weights in the opposite direction. Thus, by manipulating the knobs 25a and 39a, the cage 7 and the weights 66, 66a may be rotated by means of the before described train of gears, selectively in either direction as a unit relative to the rotating wheel and the mounting disk 17 fixed thereto so that when the vibration of the rotating wheel is reduced to a minimum, the two weights are located (see Fig. 11) on the side of the wheel opposite the heavy spot 86 therein and are located on opposite sides of and equally distant from a diametral line passing through the heavy spot 86 of the wheel. Stopping or slowing down the rotation of one of the two knobs 46a, 59a with the rotating wheel causes the two rotating weights 66, 66a, by means of the associated train of gears previously described, to move equal distances towards one another (see Fig. 12) to thereby increase the effective counterweight; and a similar manipulation of the other of said knobs causes said weight to move by reversal of the gear train equal distances away from each other to thereby decrease the counterbalancing effect thereof. When the weights 66, 66a are diametrically opposite each other (see Fig. 4), they are in equilibrium and have no counterbalancing effect on the wheel; and when they are swung together (see Fig. 13) they provide a maximum counterbalancing effect.

From the foregoing, it is obvious that the hereinbefore described wheel balancing device is light, strong, durable, compact and simple and economical to manufacture. The device can be easily carried by the hand and readily mounted on and dismounted from the wheel as a complete self-contained unit. The location and magnitude of the correction weight required to balance the wheel can be quickly and easily determined merely by lightly gripping the different readily accessible central knobs of the unit as it rotates with the wheel.

Obviously, the hereinbefore described balancing device admits of considerable modification without departing from the invention. Therefore, I do not wish to be limited to the precise construction shown and described.

What I claim is:

1. A device for determining and correcting the dynamic unbalance of a rotating wheel comprising a mounting disk adapted for mounting on the wheel coaxially thereof and for rotation therewith; a housing mounted on said disk coaxially thereof for rotation therewith and relative thereto; a pair of weighted arms journaled on said housing at the rotary axis thereof; means carried by said housing for rotatably adjusting said arms and housing in either direction as a unit relative to said disk, said means comprising a shaft journaled in said housing coaxially therewith, a second shaft journaled on said first mentioned shaft, two operating knobs fixed one to each of said shafts, two beveled gears fixed one to each of said shafts, a beveled pinion journaled in said housing and intermeshing with both of said beveled gears, a worm fixed to said first mentioned shaft, a cross shaft journaled in said housing, a worm gear fixed to said cross shaft and intermeshing with said worm, a gear formed on said disk concentric therewith, a gear journaled in said housing and intermeshing with the gear on said disk and a pinion fixed to said cross shaft and intermeshing with said last mentioned gear; and means carried by said housing for rotatably adjusting said arms toward or away from one another relative to said disk and housing in all positions of unitary rotary adjustment of said arms and housing.

2. The combination set forth in claim 1 wherein said second mentioned means comprises a third shaft journaled on said second shaft, a fourth shaft journaled on said third shaft, two operating knobs fixed one to each of said third and fourth shafts, two beveled gears fixed one to each of said third and fourth shafts, a beveled pinion journaled in said housing and intermeshing with both of said beveled gears, a worm fixed to said third shaft, a cross shaft journaled in said housing, a worm gear fixed to said cross shaft and intermeshing with said worm, a countershaft journaled in said housing parallel with said third and fourth shafts, a second countershaft journaled on said first mentioned countershaft, two beveled gears fixed one to each of said countershafts, a beveled pinion fixed to said cross shaft and intermeshing with said two last mentioned beveled gears, two gears fixed one to each of said countershafts, and two arcuate gears one on each of said weighted arms concentric with the rotary axis thereof and each intermeshing with one of said two last mentioned gears.

3. A device for determining and correcting the dynamic unbalance of a rotating wheel comprising a mounting disk adapted for mounting on said wheel coaxially thereof for rotation therewith, a housing mounted on said disk coaxially thereof for rotation therewith and relative thereto, a pair of weighted arms journaled on said housing at the rotary axis thereof, means carried by said housing for rotatably adjusting said arms and housing in either direction as a unit relative to said disk, and means carried by said housing for rotatably adjusting said arms towards or away from one another relative to said disk and housing in all positions of unitary rotary adjustment of said arms and housing, said second mentioned means comprises two shafts journaled in said housing coaxially therewith, two operating knobs fixed one to each of said shafts, two beveled gears fixed one to each of said shafts, a beveled pinion journaled in said housing and intermeshing with both of said beveled gears, a worm fixed to one of said shafts, a cross shaft journaled in said housing, a worm gear fixed to said cross shaft and intermeshing with said worm, a countershaft journaled in said housing parallel with said two first mentioned shafts, a second countershaft journaled on said first mentioned countershaft, two beveled gears fixed to each of said countershafts, a beveled pinion fixed to said cross shaft and intermeshing with said two last mentioned beveled gears, two gears fixed one to each of said countershafts, and two arcuate gears one on each of said weighted arms concentric with the rotary axis thereof and each intermeshing with one of said two last mentioned gears.

4. A device for correcting the dynamic unbalance of a rotating wheel comprising a frame structure carried by the rotating wheel, a housing on said frame movable relative thereto, two balancing weights movably carried on said housing, separate balancing weight adjusting control means coaxial with the axis of wheel rotation located adjacent said housing, a first gear train in said housing continuously connecting one of said control means with said balancing weights for adjusting said weights relative to each other, and a second gear train in said housing continuously connecting another of said control means with said frame for adjusting said housing and balancing weights as a unit relative to said frame, said control means being fixed against axial displacement while rotating during wheel balancing and being controllable solely by a change in speed relative to wheel speed.

5. A device for correcting the dynamic unbalance of a rotating wheel comprising a frame structure carried by the rotating wheel, a housing located on the outside of said frame and having a portion disposed within said frame, said housing being movable relative to said frame, two balancing weights movably carried on said housing portion within the frame structure, separate balancing weight adjusting control means coaxial with the axis of wheel rotation located adjacent said housing, a first gear train in said housing continuously connecting one of said control means with said balancing weights for adjusting said weights relative to each other, and a second gear train in said housing continuously connecting another of said control means with said frame for adjusting said housing and balancing weights as a unit relative to said frame, said control means being fixed against axial displacement while rotating during wheel balancing and being controllable solely by a change in speed relative to wheel speed.

6. A device for use in determining and correcting the dynamic unbalance in a rotating wheel comprising a frame carried by the rotating wheel, a housing mounted on said frame at the outside thereof, said housing having a portion projecting inwardly of said frame for rotationally connecting said housing with said frame, a pair of balancing weights carried by the inwardly projecting portion of said housing for rotation therewith as a unit, and to move relative to said housing for angular movement relative to each other, first rotary control means extending from said housing coaxially of the wheel axis, a first gear train in said housing directly connecting said first control means at all times with said balancing weights to effect said angular movement thereof realtive to each other, second rotary control means extending from said housing also coaxially of the wheel axis, and a second gear train in said housing directly connecting said second control means at all times with said frame to effect rotary movement of said housing and balancing weights as a unit relative to said frame, said rotary control means and connected gear trains being fixed against axial displacement and said control means being effective solely upon a change in rate of rotation to a speed different from the speed of rotation of the wheel.

7. A device for determining and correcting the dynamic unbalance in a rotating wheel comprising a frame carried by the rotating wheel, a housing on said frame mounted to rotate with and relative to said frame, a pair of balancing weights carried by said housing to rotate as a unit therewith and to be movable angularly relative to each other, first rotary control means extending from said housing coaxially with the wheel, a first gear train in said housing at all times directly connecting said first control means with said frame to rotate said housing and weights as a unit in either direction relative to said frame, second rotary control means independent of said first control means and arranged coaxial with said first control means, a second gear train independent of said first gear train in said housing at all times directly connecting said second control means with said balancing weights to move said weights angularly relative to each other to increase and decrease the angle included therebetween during rotation with said housing, all of said rotary control means being fixed against axial displacement and being rendered effective solely upon a change in rate of rotation to a speed different from that of the wheel rotation.

8. A device for determining and correcting the dynamic unbalance in a rotating wheel comprising: a frame removably mounted on the wheel to rotate therewith; a housing carried on said frame to rotate with and relative to said frame; a pair of balancing weights carried by said housing normally to rotate as a unit with said housing and frame; a first pair of rotary control means adjacent said housing in the axis of wheel rotation, said first control means being fixed against axial movement; a first reversible gear train in said housing directly connecting said first pair of control means with said frame at all times, one of said first pair of control means effecting rotation through said first gear train of said housing and balancing weights as a unit relative to said frame in one direction, and the other one of said first pair of control means effecting a reverse direction of rotation through reversibility of said first gear train of said housing and balancing weights as a unit relative to said frame; a second pair of rotary control means coaxial with said first pair, said second control means being fixed against axial movement; a second reversible gear train in said housing directly connecting said second pair of control means with said balancing weights at all times, one of said second pair of control means effecting angular movement through said second gear train of said balancing weights relative to each other, and the other one of said second pair of control means effecting a reverse relative angular movement between said balancing weights through reversibility of said second gear train.

9. A device for correcting the dynamic unbalance of a rotating wheel comprising: a frame secured to the wheel to rotate therewith; a housing on said frame to rotate relative thereto and normally rotating with the frame and wheel; two balancing weights carried on said housing to rotate with the housing as a unit and to have relative angular movement between themselves; separate control means coaxial with the axis of wheel rotation for reversibly adjusting the unit rotation of said housing and balancing weights relative to said frame and for reversibly adjusting the relative angular relation between said balancing weights, said control means being fixed against axial displacement; a gear train in said housing connecting one of said control means at all times with said frame for effecting the said unit adjustment; and a separate gear train in said housing connecting the other of said control means at all times with said balancing weights for effecting the said relative angular adjustment, each of said gear trains including an idler gear mounted in said housing, and said control means being effective to operate said gear trains solely upon a change in speed of rotation thereof relative to the wheel speed.

10. A device for determining and correcting the dynamic unbalance of a rotating wheel comprising a mounting disk carried by the wheel adjacent one face of the wheel and coaxially rotating therewith, a housing carried on said disk coaxially with the wheel and rotatable both with and relative to said disk, a pair of weighted balancing arms pivotally connected with said housing, a first train of constantly meshing gears in said housing including a gear driving said housing relative to said disk, a second train of constantly meshing gears in said housing including a pair of coaxial countershafts extending from said housing into the plane of said weighted arms and a gear on each shaft connected with one of said arms, rotation of said countershaft gears oppositely moving said arms about said pivot connection, coaxially arranged pairs of shafts connected with said trains of gears, each pair of shafts being connected at all times into a different one of said trains of gears, and control knobs for each shaft of said pairs of shafts, said knobs being solely rotationally manipulative with respect to the direction of wheel rotation to actuate the train of gears connected thereto, said first train of gears driving said housing relative to said disk also carrying said second train of gears therewith including said countershafts and weighted arms connected thereto.

References Cited in the file of this patent
UNITED STATES PATENTS

| Number | Name | Date |
|---|---|---|
| 1,296,732 | Akimoff | Mar. 11, 1919 |
| 1,364,993 | Johnson | Jan. 11, 1921 |
| 1,625,259 | Johnson | Apr. 19, 1927 |
| 1,876,526 | Thearle et al. | Sept. 6, 1932 |
| 1,876,527 | Thearle et al. | Sept. 6, 1932 |
| 2,241,673 | Ernst et al. | May 13, 1941 |